US010246855B2

United States Patent
Greer

(10) Patent No.: US 10,246,855 B2
(45) Date of Patent: Apr. 2, 2019

(54) MATERIAL HANDLING MACHINE WITH BUCKET SHAKE CONTROL SYSTEM AND METHOD

(71) Applicant: Aaron Greer, Germantown, WI (US)

(72) Inventor: Aaron Greer, Germantown, WI (US)

(73) Assignee: Wacker Neuson Production Americas LLC, Menomonee Falls, WI (US)

( * ) Notice: Subject to any disclaimer, the term of this patent is extended or adjusted under 35 U.S.C. 154(b) by 256 days.

(21) Appl. No.: 15/289,835

(22) Filed: Oct. 10, 2016

(65) Prior Publication Data

US 2018/0100290 A1 Apr. 12, 2018

(51) Int. Cl.

| | |
|---|---|
| ***G05B 13/02*** | (2006.01) |
| ***E02F 9/22*** | (2006.01) |
| ***F15B 11/10*** | (2006.01) |
| ***F15B 11/16*** | (2006.01) |
| ***E02F 3/34*** | (2006.01) |
| *F15B 1/26* | (2006.01) |

(52) U.S. Cl.

CPC .......... *E02F 9/2228* (2013.01); *E02F 3/3414* (2013.01); *E02F 9/221* (2013.01); *F15B 11/10* (2013.01); *F15B 11/16* (2013.01); *F15B 1/26* (2013.01); *F15B 2211/411* (2013.01); *F15B 2211/426* (2013.01); *F15B 2211/63* (2013.01); *F15B 2211/665* (2013.01)

(58) Field of Classification Search

CPC . B65F 1/122; B60R 1/06; F02D 29/04; F15B 2211/411; E02F 9/2228; E02F 9/221; Y10S 901/48; B25J 1/00

See application file for complete search history.

(56) References Cited

U.S. PATENT DOCUMENTS

| | | | |
|---|---|---|---|
| 5,235,809 | A | 8/1993 | Farrell |
| 5,860,231 | A | 1/1999 | Lee et al. |
| 6,029,445 | A | 2/2000 | Lech |
| 6,725,105 | B2 | 4/2004 | Francis et al. |
| 6,757,992 | B1 | 7/2004 | Berger et al. |
| 6,763,661 | B2 | 7/2004 | Tabor et al. |
| 7,062,350 | B2 | 6/2006 | Peterson |
| 7,117,952 | B2 | 10/2006 | Bares et al. |
| 7,269,943 | B2 | 9/2007 | Buckmier et al. |
| 7,467,514 | B2 | 12/2008 | Patel |
| 7,571,604 | B2 | 8/2009 | Vigholm et al. |
| 7,726,125 | B2 | 6/2010 | Brinkman et al. |
| 7,866,149 | B2 | 1/2011 | Brinkman et al. |
| 9,085,440 | B2 | 7/2015 | Choi |

(Continued)

*Primary Examiner* — Tuan A Vu

(57) ABSTRACT

A material handling machine can be operated in a bucket shake control mode to override proportional control of a valve controlling fluid flow to and from a bucket tilt cylinder of the machine. Fluid flow through the valve upon actuation of a tilt controller such a joystick therefore is proportional to actuator stroke when the shake control system is deactivated and is always maximized regardless of actuator stroke when the shake control system is activated. Bucket shake control is activated through the manual operation of a control device such as a joystick-mounted switch. As a result of this arrangement, proportional control valve actuation always occurs immediately upon bucket tilt controller movement in a direction that is dependent upon a direction of bucket tilt controller movement from the neutral position thereof.

19 Claims, 4 Drawing Sheets

(56) References Cited

U.S. PATENT DOCUMENTS

| | | | | |
|---|---|---|---|---|
| 2005/0203691 | A1 | 9/2005 | Kim | |
| 2006/0176592 | A1 * | 8/2006 | Peterson | B60R 1/06 359/879 |
| 2007/0172340 | A1 * | 7/2007 | Curotto | B65F 1/122 414/408 |
| 2015/0134209 | A1 | 5/2015 | Lee | |

* cited by examiner

MATERIAL HANDLING MACHINE WITH BUCKET SHAKE CONTROL SYSTEM AND METHOD

BACKGROUND OF THE INVENTION

1. Field of the Invention

The invention relates to material handling machines such as skid-steer loaders or bucket loaders and, more particularly, relates to a material handling machine incorporating a bucket shake control system and method for shaking a bucket of the machine to clear lodged materials from the bucket.

2. Discussion of the Related Art

Material handling machines such as skid-steer loaders, wheel loaders, track loaders, telehandlers, and excavators often are equipped with a bucket to excavate and/or transport materials such as soil, sand, gravel, etc. The term "bucket" as used herein should be understood to mean any device utilized by a material handling machine to receive materials, move those materials from one location to another, and dump those materials. Buckets may be designed to excavate materials and/or to scoop piled materials and/or receive the materials from another machine.

For example, the typical skid-steer loader or wheel loader includes a bucket that is mounted on opposed booms that, in turn, are mounted on a mobile frame so as to be raiseable and lowerable relative to the frame. The bucket typically is mounted to the booms so as to be tiltable under control of one or more hydraulic tilt cylinders to change the inclination of the bucket relative to the booms and to the ground. Most systems employ two such cylinders located on opposite sides of the machine. Hence, with the boom at a selected height, the bucket can be tilted upward to store materials for transport and tilted downward for dumping or digging by retracting or extending the tilt cylinders.

Material handling machines often excavate and/or transport clay, mud, or other materials that are prone to sticking or otherwise lodging in the bucket even after the bucket is tilted downward, to dump it. Lodged materials typically are shaken loose from the bucket by cycling the tilt cylinders back and forth to rapidly move the bucket up and down about a baseline to dislodge the lodged materials. This "shake control" typically is performed by an operator using a bucket tilt controller such as a pedal, a lever, or a joystick.

Bucket tilt cylinders typically are actuated by electrohydraulic controls including a programmed ECU that is responsive to bucket tilt controller movement to provide smooth starts and stops and when tilting the bucket. This smooth operation, though improving stability and reducing fatigue on mechanical structures and hydraulic components during normal operation or standard tilt control, suppresses bucket shake and hinders the dislodging of lodged materials from a bucket.

To avoid this drawback, material handling machines often are equipped with a computerized bucket shake control system that, upon activation, overrides the "standard" tilt control to permit more rapid cycling of the bucket tilt cylinders and more aggressive bucket shaking than otherwise would occur. Most of these systems are rather complex in their configuration and/or operation. Most of these systems also take a substantial portion of shake control out of the hands of the operator. For example, many such systems initiate a pre-programmed shake control motion upon their activation to effect a predetermined pattern of bucket movements including predetermined amplitudes and number of cycles. The typical operator thus has little control over the actual bucket shake process. This lack of control over the process can be frustrating to some operators, particularly if the pre-programmed shake control is ineffective. Many such systems also do not shake the bucket as aggressively as might be possible, again potentially reducing the effectiveness of the systems.

The need therefore has arisen to provide a material handling machine equipped with a bucket shake control system and/or method that consistently maximizes the aggressiveness of the shaking operation upon its activation.

The need additionally has arisen to provide a shake control system and/or method that provides improved "feel" by largely leaving the characteristics of the shake control operation under the direct control of the operator.

SUMMARY OF THE INVENTION in accordance with a first aspect of the invention, one or more of the above-identified needs is met by providing a material handling machine having a mobile chassis, a boom that is raiseable and lowerable relative to the chassis, a bucket that is mounted on the boom, a tilt cylinder that is connected to the bucket and to the boom, and an electrohydraulic control system for controlling the tilt cylinder. The electrohydraulic control system includes a source of pressurized fluid such as a fixed or variable displacement pump, a reservoir, a manually operated bucket tilt controller, an electronic controller, and a proportional control valve. The proportional control valve controls the magnitude and direction of fluid flow through the tilt cylinder. The electronic controller is electronically coupled to the bucket tilt controller and to the proportional control valve. It is responsive to manual manipulation of the bucket tilt controller to actuate the proportional control valve. A manually operated bucket shake control activation device is provided that, upon activation thereof, overrides standard control in which proportional flow control valve opening degree and thus a rate of bucket tilt acceleration are dependent on the magnitude of bucket tilt controller movement. Actuation of the bucket shake control activation device initiates a bucket shake control mode in which proportional flow control valve opening degree and thus the bucket tilt acceleration are independent of the magnitude of bucket tilt controller movement.

In the bucket shake control mode, proportional control valve opening degree and thus bucket tilt acceleration may always be maximized upon bucket tilt controller movement.

Proportional control valve energization may always occur immediately upon bucket tilt controller movement and play be dependent upon a direction of bucket tilt controller movement.

In the standard control mode of operation, the bucket tilt rate is dependent on the magnitude of bucket tilt controller movement, and the bucket tilt magnitude is dependent on both the magnitude and the duration of bucket tilt controller stroke from its neutral position. In the bucket shake control mode of operation, the bucket tilt rate is independent of the magnitude of bucket tilt controller movement and is always, maximized, and the bucket tilt magnitude is dependent only on the duration of bucket tilt controller actuation.

The bucket tilt controller may comprise any operator-manipulated device or combination of devices that controls tilt and possibly other bucket and/or boom functions. The bucket tilt controller could, for example, comprise one or more foot pedals, one or move levers, and/or one or more joysticks. In one embodiment, the bucket tilt controller comprises a joystick that is moveable bi-directionally from a neutral position. The joystick may be moveable about a first axis such as side-to-side to control bucket tilt and about a second axis such as fore-and-aft to control boom lift. The shake control activation device may be a switch mounted, for example, on the joystick.

Also provided is a method of effecting bucket shake control of a material handling machine configured at least generally as described above.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
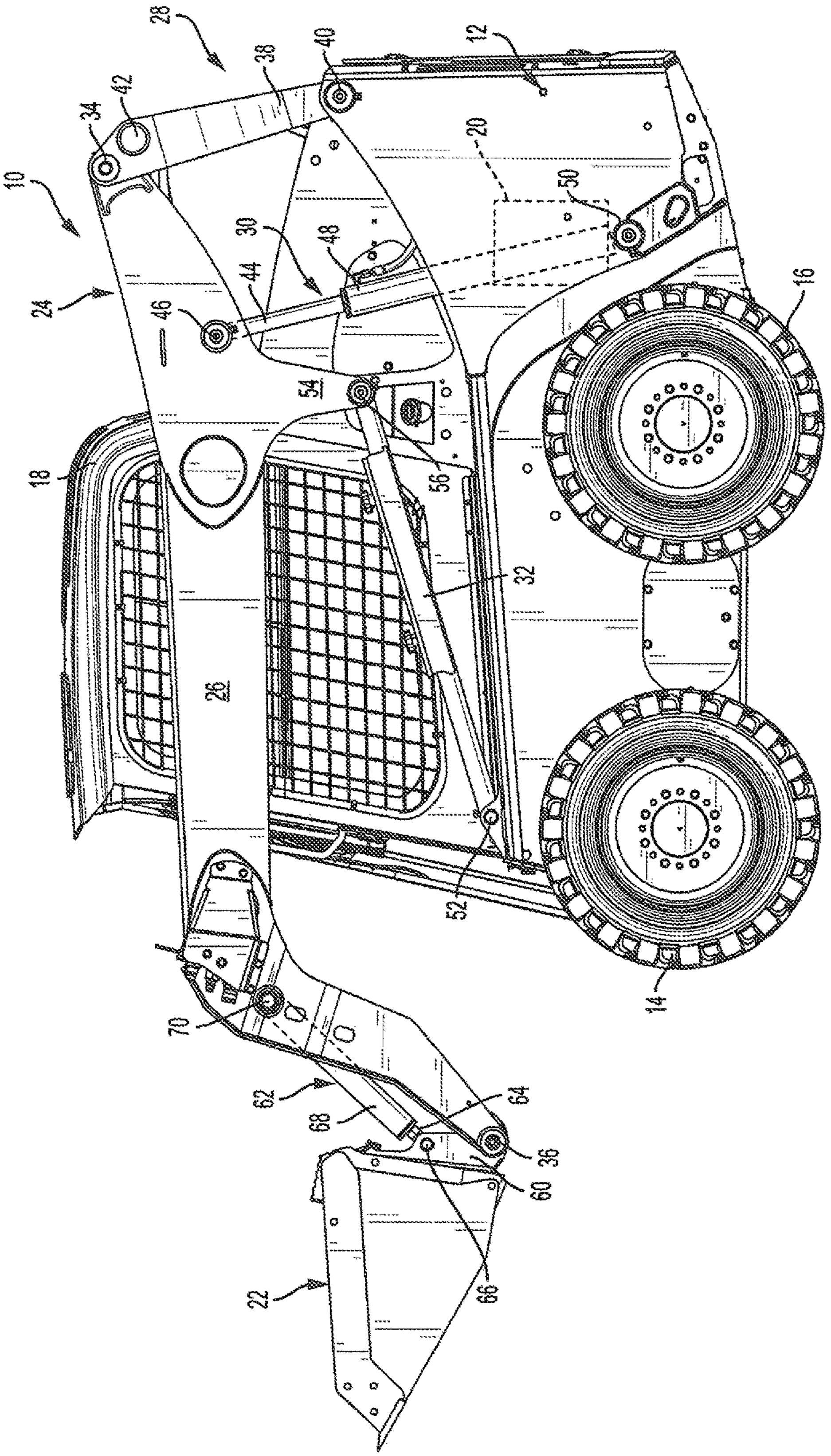
FIG. 1 is a side elevation view of a material handling machine in the form of a skid-steer loader incorporating a bucket shake control system constructed in accordance with an embodiment of the present invention.

Referring to the drawings and initially to FIG. 1, a material handling machine 10 is illustrated that is fitted with a bucket shake control system constructed in accordance with the present invention. The illustrated machine 10 is a skid-steer loader having a vertical lift arrangement. However, the concepts discussed herein apply equally to a skid-steer loader having a radial lift arrangement, as well as to a variety of other material handling machines that are equipped with a bucket to excavate and/or transport materials such as soil, sand, gravel, etc. Such machines include, but are not limited to, wheel loaders, track loaders, telehandlers, backhoes, and excavators.

The illustrated machine 10 includes a chassis or frame 12 movably supported on the ground via wheels 14 and 16. The frame 12 supports an operator's cab 18, an engine 20, and all electronic and hydraulic control systems required to propel the machine 10 and to control, its powered devices. The frame 12 may be stationary relative to wheels 14 and 16 or may be a platform that is mounted on a subframe so as to rotate about a vertical axis relative to the subframe to permit repositioning of the booms 26 (described below) relative to the subframe. Located within the cab 18 are a seat and controls (not shown) for operating all components of machine 10. These controls typically include, but are no way limited to, a steering wheel, a throttle, and one or more pedals, levers, joysticks, or switches.

Still referring to FIG. 1, a bucket 22 is mounted on the frame 12 so as to be liftable and tiltable relative to the frame 12. The bucket 22 also can be lifted relative to the frame 12 via a pair of opposed booms assemblies 24, only the left one of which is illustrated. Each boom assembly 24 is identical, consisting of a boom 26, a boom support assembly 28, a lift cylinder 30, and a link 32. The illustrated left boom 26 has a rear end that is pivotally attached to the boom support assembly 28 by a pivot pin 34. Boom 26 also has a front end that receives an associated side of the bucket via a pivot pin 36. The boom support assembly 28 includes first and second laterally spaced stationary arms 38 which flank the rear end of the boom 26 and only one of which is shown in FIG. 1. Each arm 38 has a bottom end affixed to the frame 12 at a location 40 and a top end receiving the pivot pin 34 for the boom 26. The boom support assemblies 28 on the opposed sides of machine 12 are linked by a stationary horizontal support tube 42.

Still referring to FIG. 1, the lift cylinder 30 is a double acting hydraulic cylinder that includes a rod end 44 and a barrel end 48. Rod end 44 is pivotally affixed to the boom 26 forwardly of the boom's rear end via a first pivot pin 46. Barrel end 48 is pivotally attached to the frame 12 forwardly of the boom support assembly 28 via a second pivot pin 50. The link 32 is located in from of the lift cylinder 30. Link 32 has a front end affixed to the frame 12 via a first pivot pin 52 and a rear end affixed to an ear mount 54 on the boom 26 forwardly of the lift cylinder 30 via a second pivot pin 56. Due to this construction, extension and retraction of the lift cylinders 30 raises and lowers each of the booms 26 about its rear end, with the links 32 constraining boom movement to more purely vertical movement than otherwise would be possible.

Still referring to FIG. 1, the bucket 22 bears left and right rear support plates (only the left plate 60 being illustrated) supporting the bucket 22 on the booms 26 for tilting movement. The bottom of the illustrated left support plate 60 is pivotally mounted on the front end of the boom 26 by the pin 36. The bucket 22 can be tilted relative to the booms 26 and thus relative to the frame 12 via a pair of left and right opposed double acting hydraulic tilt cylinders 62. As can be appreciated from viewing the left tilt cylinder 62 of FIG. 1, each tilt cylinder has a lower rod end 64 and an upper barrel end 68. The rod end 64 is pivotally attached to the associated bucket support plate 60 via a first pivot pin 66 located above the bottom pivot pin 36. The barrel end 68 is pivotally attached to the associated boom 26 via a second pivot pin 70. As a result of this construction, extension and retraction of the bucket tilt cylinders 62 drives the bucket 22 to tilt up and down about a horizontal axis defined by the pivot pins 36.

As mentioned above, manually operated controllers are located in the cab 18 to control boom lift and bucket tilt. In one embodiment, these controllers are integrated into a single two axis joystick 80 in FIG. 2 that can be moved along a first axis, such as fore-and-aft, to raise and lower the booms 26 and about a second axis, such as side-to-side, to tilt the bucket 22 relative the booms 26. A manually actuated device also is provided for activating the bucket shake control system. The device could be, for example, a switch such as a trigger, a push-button switch, or a toggle-switch located at any of a number of locations in the cab 18. The switch may be a momentary switch that is configured to maintain activation of the bucket shake control system for only so long as it is activated. Alternatively, the switch may be a two-way or on/off switch that is activated upon being manipulated in a first manner and deactivated upon being manipulated in a second manner. Still alternatively, the switch could be a pushbutton switch that is activated upon being depressed a first time and deactivated upon being depressed a second time. The illustrated switch 82 comprises a trigger mounted on the joystick 80. Switch 82 is operable to maintain bucket shake control activation for so long as the switch is depressed. Other switches 84 and 86 may be mounted on the joystick 80 for controlling other aspects of machine operation, such as an auxiliary device.

Figure 2:
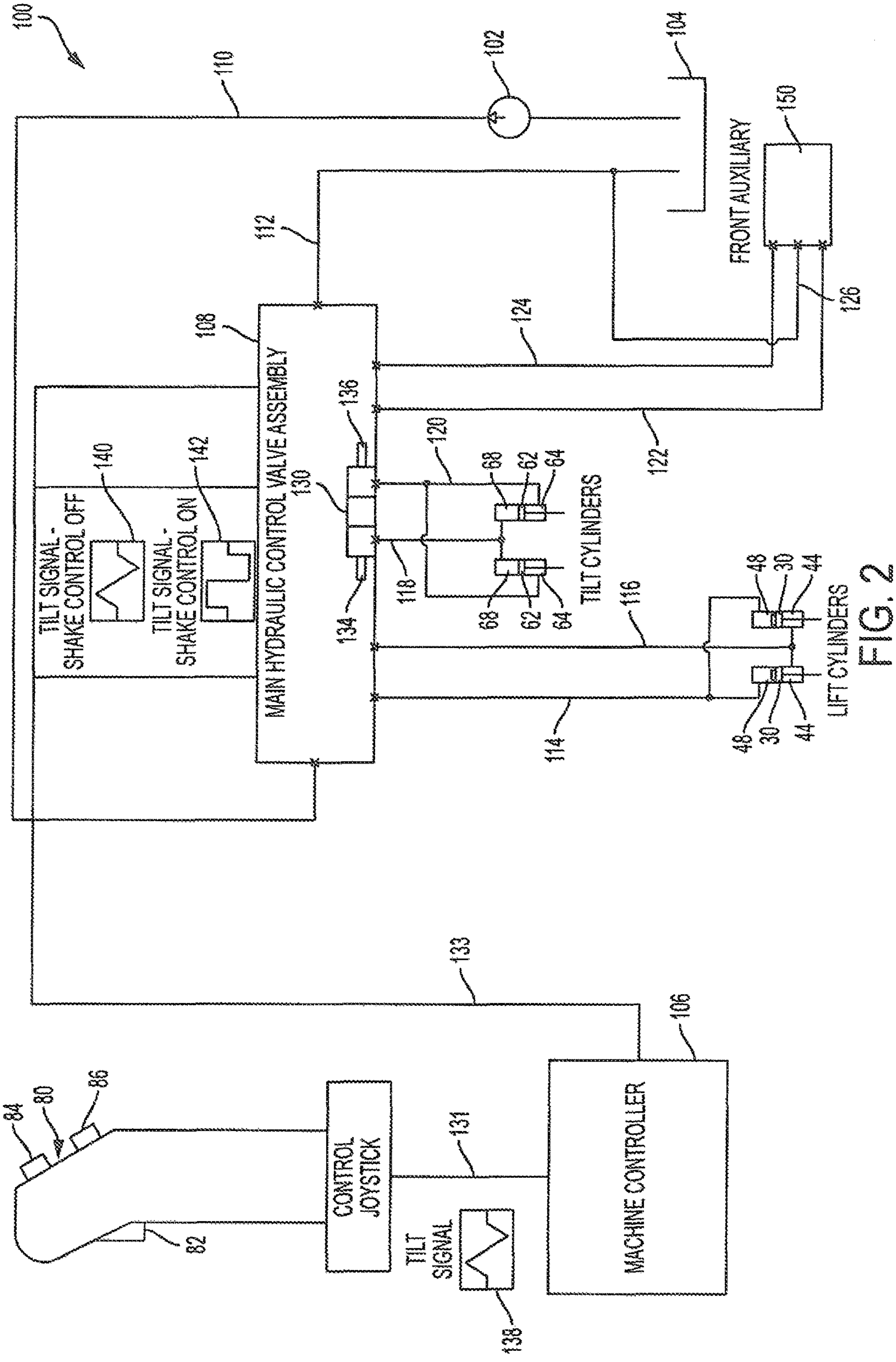
FIG. 2 schematically illustrates the bucket shake control system fitted on the machine of FIG. 1.

Still referring to FIG. 2, boom and bucket operation are controlled by an electrohydraulic control system 100 that controls operation of the lift cylinders 30, the tilt cylinders 62, and an auxiliary device 150 such as an auger, bale spears, etc. More specifically, the electrohydraulic control system 100 includes a pressure source 102, an reservoir or tank 104, an ECU or machine controller 106, and a main hydraulic control valve assembly 108. The pressure source 102 may be a fixed displacement or variable displacement pump receiving hydraulic fluid from the reservoir 104. The illustrated pump is a fixed displacement pump in the form of a gear pump driven by the machines engine 20. The main hydraulic control valve assembly 108 is hydraulically connected to the pump outlet and the reservoir by respective supply and return lines 110 and 112. Valve assembly 108 also is connected to the barrel end 48 of each of the lift cylinders 30 via a first line 114 and to the rod end 44 of each of the lift cylinders 30 via a second line 116. Valve assembly 108 also is connected to the barrel end 68 of each of the tilt cylinders 62 via a third line 118 and to the rod end 64 of each of the tilt cylinders 62 via a fourth line 120. Finally, fifth and sixth lines 122 and 124 control fluid flow to and from the auxiliary 150, which is also connected to the reservoir by a line 126. All of the lines 114-124 permit bi-directional flow therethrough in dependence on the activation state of the main hydraulic control valve assembly 108.

Still referring to FIG. 2, fluid flow to and from the tilt cylinders 62 is controlled by an electronically actuated proportional control valve 130 of the main hydraulic control valve assembly 108. Proportional control valve 130 is a three position valve that is hydraulically connected to the lines 118 and 120 leading to the barrel and rod ends of the tilt cylinders 62. It is also connected to the pump 102 and the reservoir 104. It is selectively actuatable, under control of the ECU 106, to 1) connect the barrel end 68 of each tilt cylinder 62 to the pump 102 and the rod end 64 of each tilt cylinder 62 to the reservoir 104, thus driving the tilt cylinders 62 to extend, and 2) connect the barrel end 68 of each of the tilt cylinders 62 to the reservoir 104 and the rod end 64 of each of the tilt cylinders 62 to the pump 102, thus driving the tilt cylinders 62 to retract. Valve 130 is actuated by first and second solenoids 134 and 136 under control of the machine controller 106 to drive an internal spool left or right. The spool normally assumes a neutral, centered, position isolating the tilt cylinders 62 from the pump 102 and from the reservoir 104. The degree of spool movement in a given direction, and thus the degree of valve opening and the resultant fluid flow rate into and out of the tilt cylinders 62, is dependent on and generally proportional to the voltage applied to the solenoids 134 and 136.

The electronically actuated valves of the main hydraulic control valve assembly 108 are actuated via signals from the ECU 106 in response to the actuation of manual-operated controllers including a bucket tilt controller, which as indicated above takes the form of the joystick 80 in this particular embodiment. Command signals generated by the joystick 80 are transmitted to the ECU 106 via a signal line 131, and the ECU transmits, output signals to the main hydraulic control valve assembly 108 via a signal line 133.

In operation, a bucket tilt control signal voltage having a given waveform 138 is transmitted to the ECU 106 upon joystick movement from its neutral position. This waveform 138 is proportional to joystick stroke at all times, and is represented schematically by the inclined nature of the waveform 138.

During standard operation with the bucket shake control system deactivated, the ECU 106 outputs a waveform 140 to the proportional control valve 130 that corresponds in, magnitude and slope to the waveform 138 received from the joystick 80. The voltage applied to the solenoids 134 and 136 of the valve 130 thus is proportional to the magnitude of joystick stroke. The valve 130 thus opens at least generally proportionally to the magnitude of joystick upon movement from its neutral position and opens in the direction of joystick movement. Hence, the valve opening degree and, accordingly, fluid flow rate though the valve 130 and the rate of cylinder tilt movement, increases progressively with the magnitude of joystick stroke. The valve 130 thus opens minimally during small joystick strokes to provide smooth, slow bucket tilt rates and opens fully when the joystick is fully actuated to maximize bucket tilt rates. The ultimate degree, of bucket tilt depends upon the magnitude of fluid flow in a given direction which, in turn, depends upon both the magnitude of joystick stroke, which affects tilt rate, and the length of time that the joystick as actuated, which affects the time that the bucket continues to tilt.

However, when bucket shake control is activated by actuation of switch 82, the proportional control of the valve 130 is overridden by the ECU 106 so that the voltage output by the ECU 106 is always maximized upon joystick movement from its neutral position regardless of the magnitude of joystick stroke. As a result, and as can be appreciated from the waveform 142, the proportional control valve control signal immediately ramps to its maximum value upon movement of the joystick 80 from its neutral position and remains at that value until the joystick 80 is returned to its neutral position, whereupon it immediately ramps back down to zero. Valve opening degree and thus fluid flow rate through the tilt cylinders 62 therefore are maximized whenever the joystick 80 is actuated. As a result of this configuration, rapid cycling of the joystick 80 back and forth through the neutral position results in aggressive shaking of the bucket 22 due to the fact that frequent rapid reversals of fluid flow though the tilt cylinders 62 causes frequent large acceleration and deceleration in both directions.

Figure 3A:
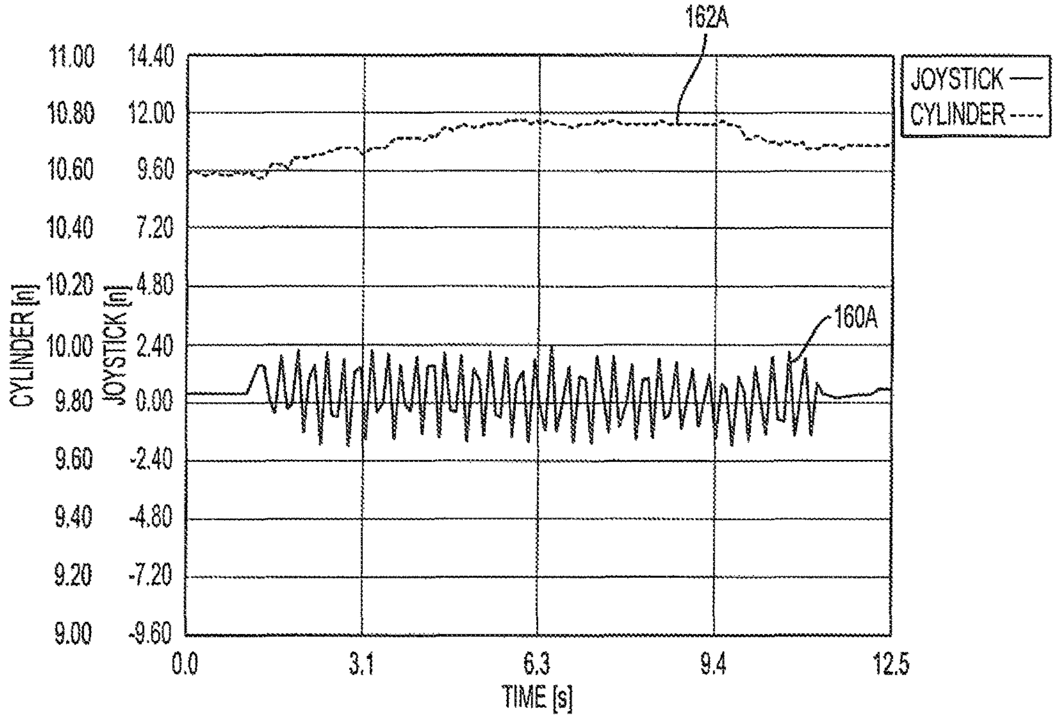
FIG. 3A is a family of curves illustrating joystick and bucket tilt cylinder stroke vs. time during a standard mode of operation of the material handling machine of FIGS. 1 and 2, with a joystick being rapidly cycled back and forth.
Figure 3B:
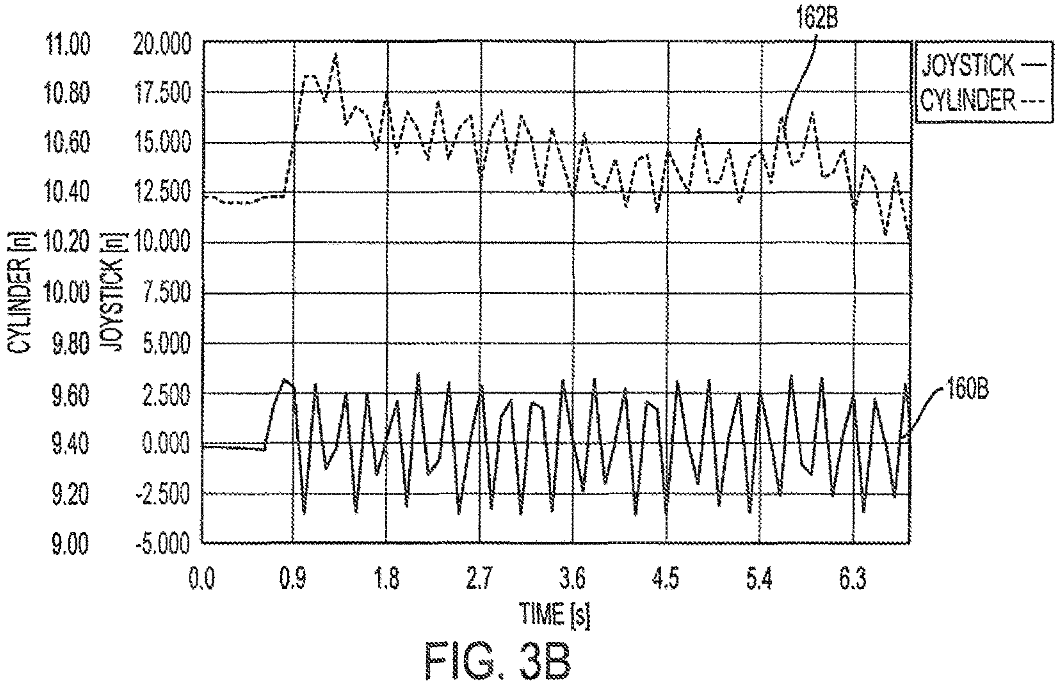
FIG. 3B is a family of curves illustrating joystick and bucket tilt cylinder stroke vs. time of the material handling machine of FIGS. 1 and 2, with the joystick being cycled generally as in FIG. 3A and with a bucket shake control mode of operation being activated.
Figure 4:
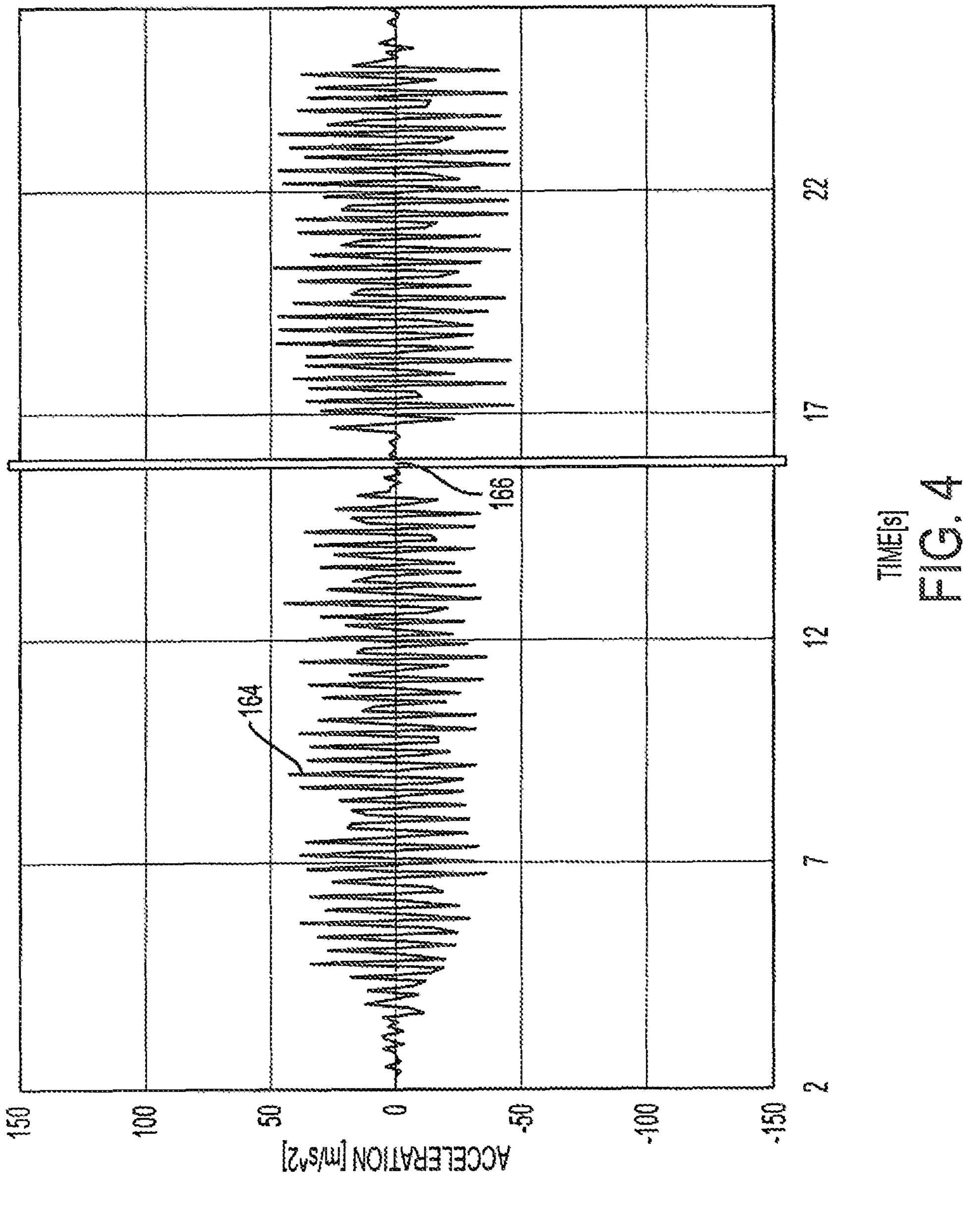
FIG. 4 is a graph plotting tilt cylinder acceleration vs. time during rapid joystick cycling in both standard and bucket shake control modes of operation.

Operation of the bucket shake control system, as thus-far described is illustrated graphically in FIGS. 3A, 3B, and 4. Both FIGS. 3A and 3B plot joystick stroke vs. time via, respective curves 160A and 160B and also plot cylinder stroke, vs. time via, respective curves 162A and 162B. FIG. 3A plots response with bucket shake control deactivated, and FIG. 3B plots response with bucket shake control activated. Comparing curves 160A and 160B, joystick stroke and the frequency of joystick cycling in the form of back and forth movement from its neutral position are essentially the same under both operating conditions. Both curves 160A and 160B illustrate rapid or violent joystick cycling with the bucket tilt cylinders 62 near full extension, replicating a scenario in which the operator is attempting to clear a bucket 22. Curves 160A and 160B indicate that bucket movement follows joystick movement in both operational modes. Hence, the bucket is always tilted immediately upon generation of a tilt command signal by movement of the joystick 80 from its neutral position and tilts in the commanded direction. The bucket tilt magnitude also is dependent upon the joystick actuation time in both modes.

However, comparing curve 162A to curve 162B, the magnitude of cylinder tilt is dramatically higher with the bucket shake control system activated. The magnitude of this difference may be 10:1 or greater. Shake aggressiveness in terms of bucket acceleration can also be appreciated with reference to FIG. 4, in which the curve 164 plots bucket acceleration vs. time during the same type of joystick operation. Point 166 on curve 164 designates the time at which bucket shake control was activated by actuation of switch 82. A comparison of the portion of the curve 164 generated after shake control activation to the portion of the curve 164 generated prior to bucket shake control activation reveals that maximum bucket acceleration in each cycle is noticeably higher when bucket shake control is activated.

Although the best mode contemplated by the inventors of carrying out the present invention is disclosed above, practice of the present invention is not limited thereto. It is appreciated that various additions, modifications and rearrangements of the aspects and features of the present invention may be made in addition to those described above without deviating from the spirit and scope of the underlying inventive concept. The scope of some of these changes is discussed above.

What is claimed is:

1. A material handling machine:

A. a mobile chassis;

B. a boom that is mounted on the chassis;

C. a bucket that is mounted on the boom;

D. a tilt cylinder that is connected to the bucket and that is selectively actuatable to tilt the bucket up and down relative to the boom, the tilt cylinder having a rod end and a barrel end; and E. an electrohydraulic control system comprising (1) a source of pressurized fluid source, (2) a reservoir, (3) an electronically actuated proportional control valve that is hydraulically coupled to the rod end of the tilt cylinder, the cylinder end of the tilt cylinder, the pressurized fluid source, and the reservoir, (4) a manually operated bucket tilt controller, (5) an electronic controller that is electronically coupled to the bucket tilt controller and to the proportional control valve and that is responsive to manual manipulation of the bucket tilt controller to control the proportional control valve to selectively and alternatively extend and retract the tilt cylinder, and (6) a manually operated bucket shake control activation device that, upon activation thereof, overrides control of the proportional control valve from a standard control mode in which proportional flow control valve opening degree is dependent on the magnitude of bucket tilt controller movement from a neutral position thereof, to a bucket shake control mode in which proportional flow control valve opening degree is maximized at all magnitudes of bucket tilt controller movement from the neutral position thereof.

2. The material handling machine of claim 1, wherein the electronic controller is configured such that, in the bucket shake control mode, proportional control valve energization always occurs immediately upon bucket tilt controller movement from the neutral position thereof and a direction of fluid flow through the proportional control valve is dependent upon a direction of bucket tilt controller movement from the neutral position thereof.

3. The material handling machine of claim 1, wherein the bucket tilt controller is a joystick that is moveable bidirectionally from the neutral position thereof.

4. The material handling machine of claim 3, wherein the boom is liftable relative to the chassis under control of a lift cylinder.

5. The material handling machine of claim 4, wherein the joystick is moveable about a first axis to control bucket tilt and about a second axis to control boom lift.

6. The material handling machine of claim 3, wherein the bucket shake control activation device is mounted on the joystick.

7. The material handling machine of claim 6, wherein the proportional control valve is controlled in the bucket shake control mode for so long as the bucket shake control activation device is activated.

8. The material handling machine of claim 1, wherein the pressurized fluid source comprises a fixed displacement pump.

9. The material handling machine of claim 1, wherein, when the bucket tilt controller is in the neutral position thereof, the proportional control valve is closed to prevent any fluid flow therethrough.

10. A material handling machine:

A. a mobile chassis;

B. a boom that is raiseable and lowerable relative to the chassis, the boom having a first end mounted on the chassis and a second end;

C. a bucket that is mounted on the second end of the boom;

D. a tilt cylinder that is connected to the bucket and that is selectively actuatable to tilt the bucket up and down relative to the boom, the tilt cylinder having a rod end and a cylinder end; and E. an electrohydraulic control system comprising (1) a fixed displacement pump, (2) a reservoir, (3) an electronically actuated proportional control valve that is hydraulically coupled to the rod end of the tilt cylinder, the cylinder end of the tilt cylinder, the pressurized fluid source, and the reservoir, (4) a manually operated joystick that is moveable bidirectionally about an axis from a neutral position thereof, (5) an electronic controller that is electronically coupled to the joystick and to the proportional control valve and that is responsive to manual manipulation of the joystick to control the proportional control valve to selectively and alternatively a) connect the barrel end of the tilt cylinder to the reservoir and the rod end of the tilt cylinder to the pump when the joystick is moved in a first direction from the neutral position thereof and b) connect the rod end of the tilt cylinder to the reservoir and the bucket end of the tilt cylinder to the pump when the joystick is moved in a second direction from a neutral position thereof, and (6) a manually operated bucket shake activation switch that is located on the joystick and that, upon activation thereof, is active to override control of the proportional control valve from a first control mode in which proportional flow control valve opening degree and thus a rate of fluid flow through the tilt cylinder are at least generally proportional to joystick stroke magnitude from neutral, to a bucket shake control mode in which proportional flow control valve opening degree and thus the fluid flow rate through the tilt cylinder are maximized at all joystick stroke magnitudes from neutral.

11. The material handling machine of claim 10, wherein the joystick is moveable about a first axis to control bucket tilt and about a second axis to control boom lift.

12. The material handling machine of claim 10, wherein the proportional control valve is controlled in the bucket shake control mode for so long as the bucket shake control activation switch is activated.

13. A method of operating a material handling machine comprising a bucket of material, a tilt cylinder under the physical manipulation caused by a proportional control valve, an electronic controller coupled to a mechanical bucket tilt controller to direct hydraulic movement based on the proportional control valve for mechanically affecting motion of the tilt cylinder, the bucket tilt controller being an input device to mechanically set a bucket tilt mode, and a bucket shake switch device to initiate bucket shake control that, in turn, is subjected to the electronic controller combined with operational state at the proportional control valve, where electronic control and its energizing effect on the proportional control valve coupled to detection of state of bucket tilt control and the bucket shake control implements the material handling method, the latter comprising:

(A) during a standard operating mode, detecting a triggering event as act of manually moving the bucket tilt controller from a neutral position thereof and, in a response to the movement, automatically opening the proportional control valve at least generally proportionally to a magnitude of bucket tilt controller movement from the neutral position thereof so as to tilt the bucket of the material handling machine at a rate which is dependent on the magnitude of bucket tilt controller movement from a neutral position; then (B) responsive to a triggering event as act of manually actuating the bucket shake control activation device, initiating the bucket shake switch in a position to start a bucket shake control mode; then (C) responsive to a triggering event as act of manually moving the bucket tilt controller from the neutral position thereof and, in a response to the movement, automatically opening the proportional control valve a maximum degree regardless of the magnitude of bucket tilt controller movement from the neutral position thereof so as to tilt the bucket of the material handling machine at a rate which is independent on the magnitude of bucket tilt controller movement from a neutral position.

14. The method of claim 13, wherein, in the bucket shake control mode, proportional control valve energization always occurs immediately upon bucket tilt controller movement and a direction of fluid flow through the proportional control valve is dependent upon a direction of bucket tilt controller movement from the neutral position thereof.

15. The method of claim 13, wherein the proportional control valve is controlled in the bucket shake control mode for so long as the bucket shake control activation device is activated.

16. The method of claim 13, further comprising, while the machine is operating in the bucket shake control mode, rapidly cycling the bucket tilt controller back and forth from the neutral position thereof to aggressively shake the bucket.

17. The method of claim 13, wherein the bucket tilt controller is a joystick that is moveable bi-directionally about a first axis from an at-rest position.

18. The method of claim 17, wherein the bucket is tiltably mounted on a boom that is mounted on a frame of the machine, and further comprising raising and lowering the boom relative to the frame by moving the joystick bidirectionally about a second axis perpendicular to the first axis.

19. The method of claim 17, wherein the actuating step comprises actuating a switch that is mounted on the joystick.

* * * * *